Dec. 1, 1931.  J. B. BARTOW  1,834,041
BEACON
Filed Jan. 14, 1930  3 Sheets-Sheet 1

Inventor
John B. Bartow
By Frank H. Borden
Attorney

Dec. 1, 1931. J. B. BARTOW 1,834,041
BEACON
Filed Jan. 14, 1930 3 Sheets-Sheet 2

Inventor
John B. Bartow
By Frank H. Borden
Attorney

Dec. 1, 1931.  J. B. BARTOW  1,834,041
BEACON
Filed Jan. 14, 1930   3 Sheets-Sheet 3

Inventor
John B. Bartow
Frank H. Borden
By
Attorney

Patented Dec. 1, 1931

1,834,041

UNITED STATES PATENT OFFICE

JOHN B. BARTOW, OF OAKLYN, NEW JERSEY, ASSIGNOR OF ONE-HALF TO CHARLES T. LUDINGTON, OF ARDMORE, PENNSYLVANIA

BEACON

Application filed January 14, 1930. Serial No. 420,783.

The present invention relates to beacons of the kind that are provided for the guidance of airplanes, and generally designated as aerial beacons.

As the art of beacons has developed heretofore, there has been particular attention paid to the pencil-beam type of beacon, with consistant attempts to secure a more highly concentrated pencil of light by improvements in reflectors and light sources, so that the shaft or pencil of light emanating from the beacon will be visible at increasingly greater distances from the light source. The major disadvantage of this type of beacon is that it requires for its success that the airplane pilot be flying substantially in the horizontal plane traversed by the pencil of light in the rotative movement of the beacon. If the pilot is flying either above or below this plane, the utility of the beacon is sharply decreased and becomes completely non-existant if there is a layer of clouds or fog between himself and the plane of revolution of the beam from the rotating beacon. This unfortunate characteristic of the present type of beacon is present under all conditions, but it is more apparent in the case of a beacon mounted on an elevation or eminence, such as a mountain peak. In this case, as in all commercial installations of pencil-beam beacons, the beam is projected horizontally. In the case of a pilot flying toward the mountain peak, well below the horizontal plane in which the pencil-beam is projected, he is in desperate need of the warning purported to be given by the beacon, but he can only be apprised of the location by a refraction glow, which is, moreover, owing to the rotation of the beacon, of such brief duration as to be unrecognizable either as to direction or as to the location of the source. It frequently happens that cloud banks shroud mountain peaks so that even the refraction glow of the beam is shielded from the pilot and he is not warned of the dangerous proximity of the peak. Although it is possible to produce a concentrated beam as discussed, in the form of a light shaft or pencil, which under favorable conditions may be visible for a long distance, yet this is necessarily accompanied by a further disadvantageous factor, in that as the beacon is revolved about a vertical axis the observer is subject to alternate flashes of blinding brilliance and complete and total absence of light, as the closed rear portion of the beacon is turned toward him in the rotation of the beacon.

Among the objects of the present invention are; to distribute the light from a lamp or source in such a way that it can be seen at any point above the ground so that even with poor visibility the light is clearly visible from airplanes flying at high level and at low level and at all levels between the two, because at some moment in each complete revolution the airplane will be in the direct beam of the light; to accomplish the previous object with a lamp or source relatively inexpensive and economical in operation; to provide a beacon with means for ascertaining the height of the clouds; to provide a beacon which is of value as a night landing light for aircraft; to provide a beacon of which the beam having once attracted the attention of an aviator will never go out in the sense that the aviator can always see some light even when he is not in its direct beam; to overcome the difficulties attendant upon the use of beacons heretofore provided in the art; to provide a beacon combining the advantages of the pencil type beacon with a supplemental beam extending in a plane at an angle to the vertical and to the horizontal such as to act as a signal to pilots flying above and below the horizontal as well as horizontally; to provide a highly efficient beacon at a reduced cost of construction; and many other objects and advantages as will become more apparent as the description proceeds.

Generally stated, the invention includes a lamp or source, and a three hundred and sixty degree lens or combination of lens and reflector and of the general form of the equatorial segment of a sphere or cylinder and adapted to project light, and if desired a portion of the cylindrical lens may comprise a reflecting surface or a beam bull's-eye lens. It is preferred that the bull's-eye lens be molded or otherwise disposed arcuately in the circumference of the cylindrical lens in such manner that the projected pencil-beam of light always will be disposed in a horizontal plane.

The invention also comprises the improvements to be presently described and finally claimed.

In the following description, reference will be made to the accompanying drawings forming part hereof and in which.

Figures 1, 2, 3, 4, 5:
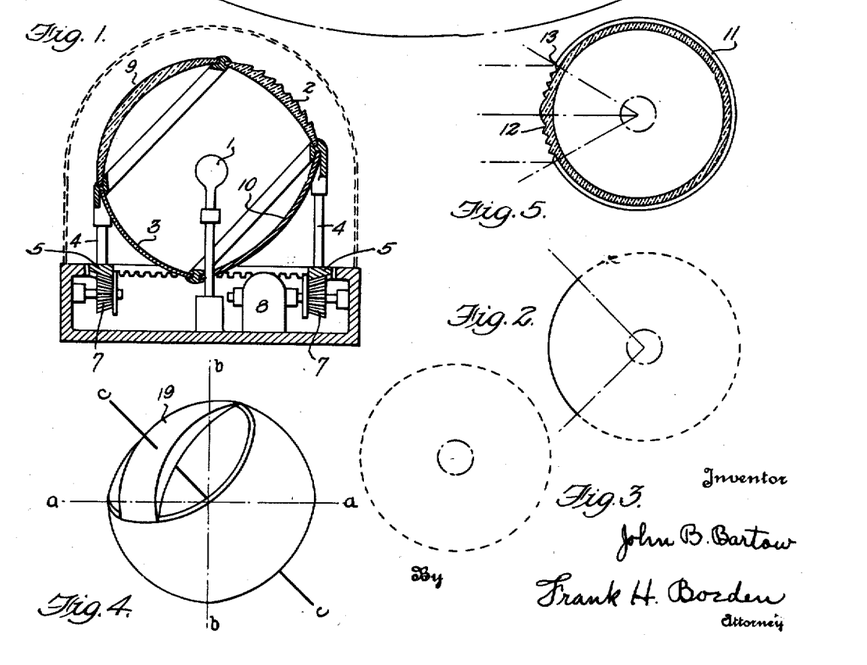
Fig. 1 represents a sectional elevation of a beacon embodying features of the invention.
Figs. 2 and 3 represent diagrammatic sections illustrating in Fig 2. a combination of lens and reflectors and in Fig. 3 a three hundred and sixty degree lens.
Fig. 4 represents a diagrammatic perspective of a modification of the invention.
Fig. 5 represents a diagrammatic section through a combination of lenses as used in this invention.

Referring to Fig. 1, 1 is a lamp or source. The lens element included between the dash lines comprises a lens proper 2, and a reflector 3, and it conforms substantially to the equatorial segment of a sphere. The lens element 2 is preferably of the type known as Fresnel. It is mounted with its axis inclined to the vertical and it is rotatable about a vertical axis. As shown the element referred to is mounted by means of posts 4 upon the carriage 5 in the form of a crown toothed wheel arranged to run upon pinions 7 of which one is driven by the motor 8. The lens element projects light into an inclined plane which may be said to be bounded by the dash and dot line in Fig. 1. One way to describe it is to say that around the beacon there is a halo of light inclined to the vertical and therefore visible at a great many different elevations from the ground. As the lens element is rotated around a vertical axis this described inclined illumination can be seen from all points of approach to the beacon. As shown, the lens element is provided with a polar lens 9 and its complemental reflector 10, and when these are present there is projected an additional beam of light which is inclined relative to, but rotates about, a vertical axis.

It will be understood that with the device as disclosed there will emanate from the light source, mounted substantially on the axis of the substantially cylindrical lens, a substantially flat concentrated beam of light radiating through an appreciable arcuate area of the lens in the form of a sheet or halo as noted. When the beacon is so inclined that its optical axis is at an angle to the vertical this sheet or halo of light follows a path parallel with a plane angularly divergent from but intersecting the horizontal. The degree of tilt of the beacon may obviously be varied to accord with requirements, but as an illustrative and useful angular inclination let us assume thirty degrees. In the rotative movement of the beacon about a vertical axis the fan shaped flat sheet of light will present to a pilot within a range of sixty degrees, (i. e. thirty below the horizontal to thirty degrees above the horizontal), two edges of the flat concentrated beam, serially, in the cycle of rotative movement. The visual effect of the beam in the path of which the pilot is flying, is to the observer as of a slightly tilted luminous thin line, followed when the other edge of the sheet reaches him in its rotative movement, by a second, oppositely tilted, thin luminous line. Thus the pilot has the benefit of two flashes of the beacon in a single revolution, and this flash extends along any path he may be flying within the vertical angular range of the beacon. Moreover, as an important advantage of this beacon, regardless of the particular form which it may assume, the lens construction being as it is, is subject to the passage of more or less stray light not concentrated in the beam. Not very much to be sure, and not enough to affect the efficiency of the projected concentrated beam, but enough to be constantly visible to the pilot to mark the location of the source or of the beacon site. In a sense therefore the light never goes out and once the beam has attracted the attention of the aviator he can still see some light visible and emanating from the beacon even when he is not in the direct beam thereof. This is in contrast to the complete obliteration of illumination when the ordinary pencil or bull's-eye type of beacon is rotated upon its axis.

Although in the form of the invention heretofore described, it will be obvious that the Fresnel lens may be of three hundred and sixty degrees or less in peripheral extent, yet it is preferred that this lens be at least of one hundred and eighty degrees, so that with the inclination as described there may be rays in the beam projected simultaneously horizontally and both above and below the horizontal. If it is desired to subject the pilot to but one flash from an edge of the projected flattened beam, it would be possible to carry the reflector or the like, further around one side of the circumference of the lens so as to affect the light projecting peripheral area of the lens, as will be clear. This may not be as effective a warning signal as when the beam is of such extent as to subject the pilot to warning flashes from two edges, serially, of the projected beam, but might have other compensations such as the intensification of the projected beam or allow for the provision of other lens elements in the periphery to provide a different supplemental or auxiliary type of beam. However, as noted it is highly desirable that the projected beam be such that there are rays projected simultaneously in paths angularly divergent from the horizontal, both above and below same, as well as horizontally. This directional projection has another decided advantage, especially for small fields. It is known that a system of landing lights for airports involves considerable investment. It is included as an object of this invention to utilize the beacon of the invention as an adequate substitute therefor. Assuming the beacon of this invention to be mounted on an eminence, such as the top of a hangar, or a tower or the like, and with the plane of light following a path parallel with a plane angularly divergent from but intersecting the horizontal, it will be understood that by stopping the rotation of the light at a predetermined point, this will cause certain of the rays in the beam extending below the horizontal to be incident upon the ground to form an illuminated strip of ground upon which the pilot may alight. The location of the strip illumined by the beacon can be varied in accordance with wind direction etc. so that the pilot may be apprised of the direction in which to land by the direction of the extent of illumined ground. This is an important feature of the invention as the beacon is well adapted for the purpose. It will be observed that the availability of the beacon for night landings is not minimized as by having the illuminated strip extending toward the light itself, as the rays incident upon the ground are according to the tilt of the beacon, well spaced from the beacon, and strike the ground so as to form an illuminated rectilinear path parallel to but spaced from a line tangent to the periphery of the cylindrical lens, and thus leading to an area always clearly spaced from the beacon.

The bull's-eye or pencil-beam type of beacon can be seen under favorable conditions for a greater distance than the beacon of this invention, although, as noted, under unfavorable conditions, (when the beacon is relied upon to the highest degree) it is not as satisfactory as the beacon herein described, but this invention further contemplates a securing of the advantages of both types of beacons by a unitary structure to be described.

Figure 6:
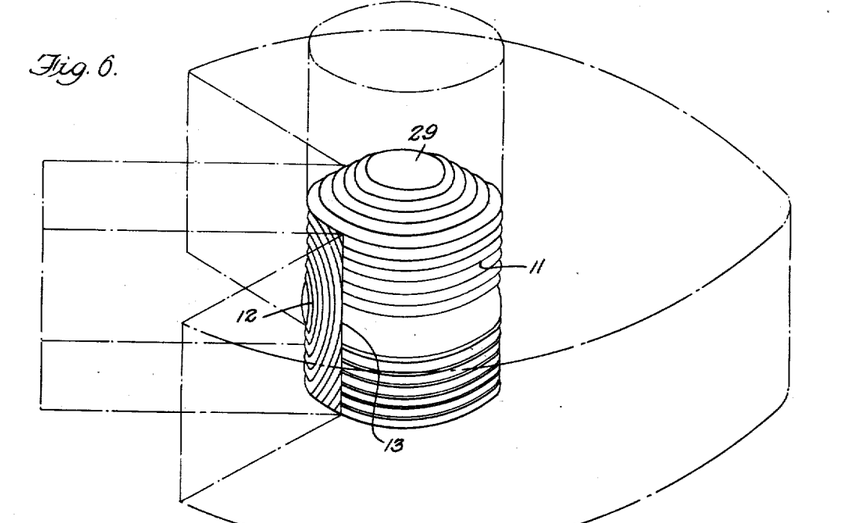
Fig. 6 represents a diagrammatic perspective of the preferred form of beacon with the rays emanating therefrom disclosed as though cut off at a predetermined distance radially of the light source.
Figure 7:
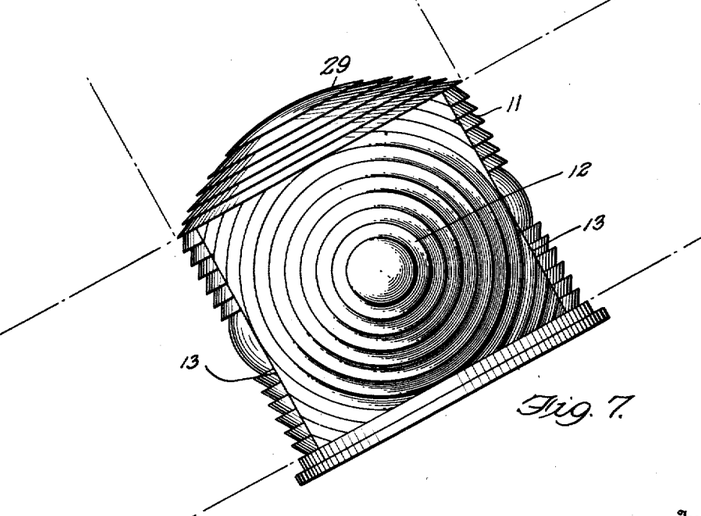
Fig. 7 represents a side elevation of the preferred form of the invention.
Figure 8:
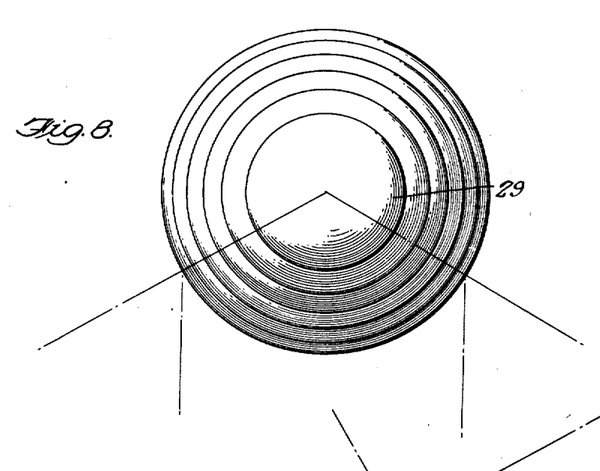
Fig. 8 represents a top plan of the preferred form of the invention.

As shown in Figs. 5, 6, and 7, the cylindrical lens which may be of the Fresnel type, and which may be molded, or formed in sections cemented together, or otherwise formed, has a bull's-eye lens, or its equivalent, inserted in its periphery to form a complete cylinder.

In the preferred form of the modification embodying the bull's-eye reflector, the Fresnel lens or the like as 11, forming a semi-cylindrical body, extends peripherally for a desired extent, such for instance as two hundred and forty degrees. The remaining one hundred and twenty degrees of peripheral lens area is occupied by the bull's-eye lens element 12, which is outwardly convex so as to merge into the arcuate extent of the Fresnel lens, in the preferred embodiment, and its jointure with the edges of the Fresnel lens 11, as at 13, is preferably by means of straight edges parallel with the axis of the cylindrical lens. It is preferred that the optical axis of the lens element 12 be disposed perpendicularly to the axis of the Fresnel lens element. Obviously the relative peripheral extent of Fresnel lens and bull's-eye lens may be varied as desired. The effect of this assembly into one unit, with a light source properly disposed substantially on the axis of the cylindrical element, is to provide through lens 11, the flattened broad sheet of light as in the structure already described, which terminates in a wedge shaped gap, in which a secondary beam of light projected through the bull's-eye lens 12 will be located, of such extent as almost to fill the gap and to form a substantially continuous beam in the plane of the flattened broad sheet transmitted through the Fresnel lens 11. Although there will be a more or less appreciable space between the edges of the pencil-beam projected through the bull's-eye lens 12, and the edges of the flat sheet through the remainder of the lens in the beacon, inevitably there will be stray light coming from both lenses sufficient to hold the attention of the observer despite the fact that there are no concentrated rays in this small area.

It is preferred that the bull's-eye lens be so disposed in the periphery of the composite lenses and the inclination of the whole to be such that a vertical plane passing through the lowermost edge of the inclined beacon and coincident with the axis of the Fresnel lens will cut only the Fresnel lens and not the bull's-eye lens. In other words, and as shown in Fig. 7, the bull's-eye is disposed with its optical axis always on the horizontal, despite the inclination of the system as a whole. This may be understood better by saying that the chord of the bull's-eye lens is substantially parallel to a vertical plane which is coincident with the inclined axis of the cylindrical system of lenses. In the perspective disclosure of Fig. 6, the relationship of the two distinct beams of the beacon is indicated and it will be clear that inclining the beacon by swinging it about a horizontal axis coincident with the optical axis of the bull's-eye lens, will cause the beam from the Fresnel lens to follow a path parallel to a plane angularly divergent from but intersecting the horizontal while the pencil beam from the bull's-eye is projected horizontally. The effect of the composite beacon upon a pilot flying within the vertical angular dispersion of the beacon will be the same as in the first form disclosed, when the first edge of the inclined beam meets his eye, but which is of a different effect when the beacon rotates one hundred and eighty degrees in that if he is in, or substantially near the horizontal plane of projection from the bull's-eye beacon he will be subjected to a concentrated beam which, being visible for far greater distances than the flat beam, will function for its long range effect which is not lost as he approaches the beacon. If he is flying in such position that he is located in the gap between the inclined flat and horizontal beams, he will not see two edges of the beam as in the first form disclosed, but only the one.

The possible disadvantage of not seeing two serially exposed edges is more than compensated for by seeing one edge and then being exposed to the pencil-beam effect of the bull's-eye lens.

In the form of the invention disclosed in Fig. 1 the supporting base is best adapted for the type of beacon having a reflector, or the like, in its lowermost portion, as in that illustration the base intercepts some of the downwardly projecting rays so that the amount of light that could be projected downwardly into a valley or upon the ground for night landing is minimized. For this purpose an operating structure such as is disclosed in Fig. 9, may be used, in which a housing 14 having a motor 15 driving shaft 16, which is in mesh with a worm wheel 17 driving the vertical shaft 18 upon the upper end of which a turn table 20 is mounted in driving relation. This may be supported upon suitable anti-friction devices 21 as shown. A vertical plate, or the like, 22 may be provided on the turn table 20 upon which, by bolt 23 the lens support 24 may be mounted. Means may be provided to vary the inclination of the beacon, as for instance, by providing an arcuate rack 25 in mesh with a worm gear 26, operated by a hand wheel 27. A thumb nut 28 may be provided for locking the lens support 24 to the plate 22.

Figure 10:
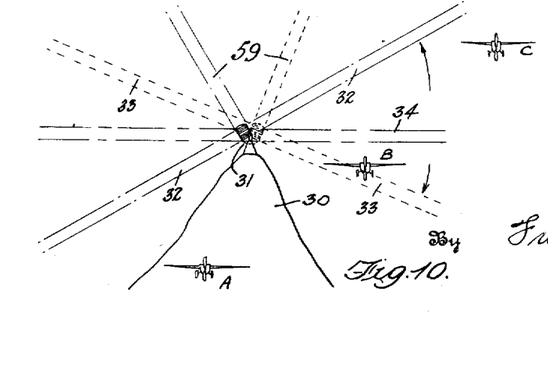
Fig. 10 is a diagrammatic representation of the beacon of this invention mounted on a mountain peak with a series of airplanes flying at different levels indicating in dotted and dashed lines the direction of beams from the beacon.

In the fragmentary diagrammatic disclosure of Fig. 10 a mountain peak or other eminence 30 has a beacon, as of this invention, mounted on its crest as at 31. The dash and dot lines 32 indicate the path of the flat beam of the beacon in one position thereof and the dotted lines 33 indicate a secondary position of the inclined flattened beam. The airplanes A, B, and C flying, as will be observed, at different altitudes, will each be exposed to at least one edge of the concentrated flattened beam in the rotation of the beacon. If the form of the invention disclosed in Figs. 5, 6, and 7 is used, there will also be a bull's-eye pencil-beam projected in a horizontal plane as indicated by the dash and dot lines 34 in which event it may be that airplane B (flying just below level of the bottom) will only receive a signal impulse from one edge of the beam projected through the Fresnel lens, but will have the benefit of the pencil-beam in place of the secondary edge of the flattened beam as will be clear.

Figures 9, 11:
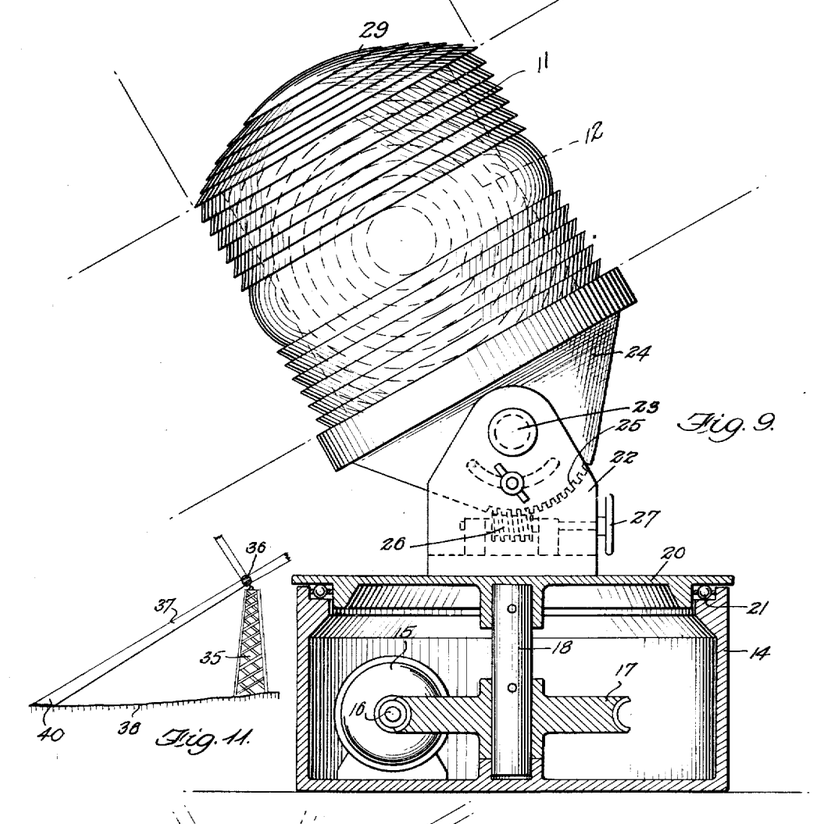
Fig. 9 represents a side elevation partially in section of a form of the invention disclosed by the diagrammatic views of the invention disclosed by Figs. 3 and 5.
Fig. 11 represents a fragmentary elevation of support for a beacon with rays thereof projected downwardly upon the ground for a landing light.

In the fragmentary diagrammatic disclosure of Fig. 11 a tower 35 is provided supporting a beacon 36, the downwardly projecting rays 37 of which strike the ground 38 in an illuminated rectilinear strip 40. It is to be observed that in all cases the illuminated path lies in a straight line in more or less widely spaced relation to the beacon and parallel to a line tangent to the periphery of the lens.

In the modification shown in Fig. 4 the lens element extends three hundred and sixty degrees as indicated in Fig. 3, and the polar lens 19 is a strip lens and not a bull's-eye, as shown in Fig. 1. It will be clear that the bull's-eye lens has its optical axis substantially coincident with the axis of the cylindrical lens and that the arrangement is such that the beam projecting through the bull's-eye lens 9 will be perpendicular to the plane of the flat sheet projected through the cylindrical lens. When the beacon is rotated it will be understood that the pencil-beam projected through lens 9 being inclined from the vertical, will describe a cone which will be visible for appreciable distances.

In Fig. 4 the line a—a indicates the horizontal, the line b—b indicates the vertical, and the line c—c the inclined axis of the annular optical system that surrounds the radiant 1. The light falling upon the optical system is deflected to form an inclined zone of light, which may be annular, extending from the horizontal toward the zenith.

The described beacon is also a ceiling light. By that it is meant that the altitude of the clouds can be measured. As the beam from the inclined lens or the bull's-eye 9, strikes the clouds, an observer can pace or measure the distance from the beacon to the spot directly under the intersection, of the inclined beam and the clouds, and from a chart made according to the angle of the inclined beam to the horizon can ascertain the height of the clouds, the chart of course being based upon triangulation.

The preferred form of the invention shown in Figs. 6 to 9, inclusive, is also constructed to function as the modification of Fig. 4. In this preferred form there is a bull's-eye lens 29 in addition to the lens 12, the optical axis of the former being coincident with the axis of the cylindrical lens. Here also it will be appreciated that a beam of light is projected, as indicated at 59, in Fig. 11, which is perpendicular to the plane of the flat light sheet 32 projected through the lens 11. Accordingly, when the beacon is rotated it follows that the pencil-beam projected through the lens 29 being inclined with respect to the vertical will describe a cone which will be visible for a substantial distance.

The advantages of the invention are so manifest that it is not thought necessary to enlarge upon them nor upon the many modifications and alterations that will occur to those skilled in the art, all of which are to be considered in the scope of this invention as recited in the appended claims.

I claim as my invention:

1. In a beacon, a substantially cylindrical element, more than one hundred and eighty degrees of which element peripherally comprises a lens, the lens and element having an axis, a light source, means for supporting the light source substantially on said axis, the arrangement being such that a broad relatively flat beam is projected through the lens in a path substantially perpendicular to said axis, means for supporting the cylindrical element with its axis inclined from the vertical whereby the broad beam is projected divergent from the horizontal and from the vertical, and means for turning the cylindrical element about a vertical axis.

2. In a beacon, a substantially cylindrical element having an axis and comprised in part at least of an arcuate lens, a light source, a support for mounting the light source substantially on said axis, the lens and light source so disposed as to project a broad sheet of light radially of the lens in a substantial plane perpendicular to the axis, means for supporting the element and light source with the axis angularly inclined from the vertical, the plane of the projected beam being angularly divergent from both the vertical and the horizontal, and the inclination of the beam and the peripheral extent of the beam relative the lens being such that rays in said beam are simultaneously projected horizontally and above and below the horizontal, and means for turning said element about a vertical axis.

3. In a beacon, a substantially cylindrical element the major peripheral portion of which comprises a lens, the cylindrical element having an axis, a light source, a support mounting the light source substantially on said axis, the lens and light source so disposed as to project a broad sheet of light radially of the lens in a substantial plane perpendicular to the axis, means for supporting the light source and element with the axis of the latter angularly inclined from the vertical, the plane of the projected beam being angularly divergent both from the horizontal and from the vetrical, a secondary lens mounted at the upper end of the cylindrical element with its focal axis substantially coincident with the axis of the element and so arranged relative the light source as to project a secondary beam of light in a path substantially perpendicular to the first mentioned beam of light, and means for turning said element about a vertical axis.

4. A beacon including a substantially cylindrical lens having an axis, a light source, means for supporting the light source on said axis, the lens arranged whereby rays from the light source are projected therefrom as a broad beam of light, means for supporting the lens with its axis angularly divergent from the vertical whereby the broad beam of light is projected in a plane intersecting but angularly inclined from the horizontal, a secondary lens disposed upon the cylindrical lens and having a focal axis substantially coincident with the axis of the cylindrical lens whereby a secondary beam is projected which is substantially perpendicular to the first mentioned beam but which is angularly inclined from the vertical as well as from the horizontal, and means for rotating the whole about a vertical axis.

5. A beacon including an annular optical system having an axis, a light source, means mounting the light source substantially on the axis, means supporting the optical system with its axis angularly inclined from the vertical, the optical system adapted to direct rays of light from the light source radially into the air in the form of a sheet substantially surrounding the beacon and inclined from the near ground toward the zenith, and means for rotating said optical system around a vertical axis whereby an observer at any point within the range of vertical angular dispersion of the light will periodically be located in the path of said beam as it is rotated.

6. In a beacon, a substantially cylindrical lens having an axis, a light source mounted substantially on the axis, the lens arranged to project a flat sheet of light radially of the light source and substantially perpendicular to said axis, a secondary lens disposed in the periphery of the cylindrical lens the optical axis of which is substantially perpendicular to said axis, and means for supporting the lens and light source so that the axis is inclined relative to the vertical and to the horizontal but with the optical axis of said secondary lens extending perpendicular to said axis and to the vertical, and means for turning the beacon about a vertical axis.

7. In a rotatable beacon, a rotatable element comprising a substantially cylindrical lens, said lens composed of two functionally different elements, one of said elements constituting a major sector of the lens, and constructed to transmit a flat sheet of light, the other element occupying a minor sector of the cylindrical lens and constructed to project a pencil type beam of light, the inner portion of each of the sectors constituting an arcuate surface, said surfaces forming a continuation of each other to produce a uniform annular surface.

8. In a rotatable beacon, a rotatable element comprising a substantially cylindrical lens, said lens composed of two functionally different elements, one of said elements constituting a major sector of the lens, and constructed to transmit a flat sheet of light, the other element occupying a minor sector of the cylindrical lens and constructed to project a pencil type beam of light, and another lens secured to the cylindrical lens at right angles thereto and constructed to project an additional pencil type beam of light.

Signed at Philadelphia, county of Philadelphia, and State of Pennsylvania, this 6th day of January, 1930.

JOHN B. BARTOW.

and to the horizontal but with the optical axis of said secondary lens extending perpendicular to said axis and to the vertical, and means for turning the beacon about a vertical axis.

7. In a rotatable beacon, a rotatable element comprising a substantially cylindrical lens, said lens composed of two functionally different elements, one of said elements constituting a major sector of the lens, and constructed to transmit a flat sheet of light, the other element occupying a minor sector of the cylindrical lens and constructed to project a pencil type beam of light, the inner portion of each of the sectors constituting an arcuate surface, said surfaces forming a continuation of each other to produce a uniform annular surface.

8. In a rotatable beacon, a rotatable element comprising a substantially cylindrical lens, said lens composed of two functionally different elements, one of said elements constituting a major sector of the lens, and constructed to transmit a flat sheet of light, the other element occupying a minor sector of the cylindrical lens and constructed to project a pencil type beam of light, and another lens secured to the cylindrical lens at right angles thereto and constructed to project an additional pencil type beam of light.

Signed at Philadelphia, county of Philadelphia, and State of Pennsylvania, this 6th day of January, 1930.

JOHN B. BARTOW.

CERTIFICATE OF CORRECTION.

Patent No. 1,834,041.      Granted December 1, 1931, to

JOHN B. BARTOW.

It is hereby certified that error appears in the above numbered patent requiring correction as follows: Page 1, at the beginning of the printed specification insert "This application constitutes a continuation in part of an application filed May 22, 1928, Serial No. 279,768, for Beacons"; and that the said Letters Patent should be read with this correction therein that the same may conform to the record of the case in the Patent Office.

Signed and sealed this 2nd day of February, A. D. 1932.

M. J. Moore,
Acting Commissioner of Patents.

(Seal)

CERTIFICATE OF CORRECTION.

Patent No. 1,834,041.	Granted December 1, 1931, to

JOHN B. BARTOW.

It is hereby certified that error appears in the above numbered patent requiring correction as follows: Page 1, at the beginning of the printed specification insert "This application constitutes a continuation in part of an application filed May 22, 1928, Serial No. 279,768, for Beacons"; and that the said Letters Patent should be read with this correction therein that the same may conform to the record of the case in the Patent Office.

Signed and sealed this 2nd day of February, A. D. 1932.

(Seal)

M. J. Moore,
Acting Commissioner of Patents.